United States Patent [19]

Yamaguchi et al.

[11] Patent Number: 4,752,524

[45] Date of Patent: Jun. 21, 1988

[54] ABRASIVE TAPE

[75] Inventors: Nobutaka Yamaguchi; Eiichi Tadokoro, both of Odawara, Japan

[73] Assignee: Fuji Photo Film Co., Ltd., Minamiashigara, Japan

[21] Appl. No.: 920,165

[22] Filed: Oct. 17, 1986

[30] Foreign Application Priority Data

Oct. 18, 1985 [JP] Japan ................................. 60-232503

[51] Int. Cl.$^4$ .............................................. G11B 5/702
[52] U.S. Cl. ..................................... 428/323; 428/329; 428/336; 428/694; 428/900
[58] Field of Search ............... 428/323, 329, 694, 900, 428/336

[56] References Cited

U.S. PATENT DOCUMENTS 4,515,857  5/1985  Kitamoto et al. ................... 428/694
4,539,266  9/1985  Miyazaki .............................. 428/694
4,546,038  10/1985 Yamaguchi et al. ................ 428/694

Primary Examiner—Paul J. Thibodeau
Attorney, Agent, or Firm—Gerald J. Ferguson, Jr.; Michael P. Hoffman

[57] ABSTRACT

An abrasive tape comprises a flexible non-magnetic substrate, and an abrasive coating film applied onto the flexible non-magnetic substrate and formed by kneading an abrasive material and a binder essentially consisting of a vinyl chloride-vinyl acetate-maleic acid copolymer, a polyamide resin and an epoxy resin.

1 Claim, 1 Drawing Sheet

ABRASIVE TAPE

BACKGROUND OF THE INVENTION

1. Field of the Invention

This invention relates to an abrasive tape for use in the accurate polishing of a magnetic head for a magnetic recording and reproducing apparatus. This invention particularly relates to an abrasive tape for use in polishing of a video magnetic head or a high grade audio magnetic head.

2. Description of the Prior Art

Video or high grade audio magnetic heads are required to have very smooth tape sliding surfaces. Therefore, in general, in the process of making the magnetic head, the tape sliding surface is given a smooth finish by use of an abrasive tape after rough grinding. Particularly, since the video head is required to have a very high smoothness, several types of the abrasive tapes are used for polishing the video tape. Thus the video tape is first polished with a coarse abrasive tape, and finish-polished (scratch polished) with the most smooth abrasive tape at the final stage. The abrasive tape comprises a flexible non-magnetic substrate and fine abrasive particles or the like dispersed and adhered by a binder to the substrate, and can accurately polish the tape sliding surface of the magnetic head by snugly fitting to the curved shape thereof.

As such a tape, there has heretofore been known, a cleaning tape wherein, for example, a vinyl chloride-vinyl acetate copolymer, an epoxy resin and a polyisocyanate are used as the binder.

However, the purpose of the aforesaid tape is mainly to remove dust or the like from the magnetic head. For this purpose, the binder having such an adhesion that the abrasive particles do not separate from the coating film during magnetic head cleaning is used. Therefore, when the tape is used as a tape for polishing the magnetic head, since the adhesion of the binder is too low, the problem that the abrasive particles separate from the coating film during polishing of the magnetic head. Particularly, in the case of the abrasive tape, abrasive particles having large particle sizes are generally used for improving the polishing effects. However, when the average particle size is increased to a value within the range of 5 μm to 30 μm, since the particle size of the largest particle becomes markedly large as compared with the thickness of the coating film and the contact surface area ratio to the binder becomes small, the problem that the abrasive particles more readily separate from the coating film.

SUMMARY OF THE INVENTION

The primary object of the present invention is to provide an abrasive tape in which abrasive particles do not separate from the coating film during polishing of a magnetic head.

Another object of the present invention is to provide an abrasive tape which comprises a coating film exhibiting high durability and which exhibits improved durability.

The present invention provides an abrasive tape comprising a flexible non-magnetic substrate, and an abrasive coating film applied onto said flexible non-magnetic substrate and formed by kneading an abrasive material and a binder essentially consisting of a vinyl chloride-vinyl acetate-maleic acid copolymer, a polyamide resin and an epoxy resin.

The abrasive tape broadly embraces a long strip-like form, a disk-like form and a sheet-like form. Stating with regard to polishing of video heads, the present invention is concerned with a coarse abrasive tape having abrasive particle size within the range of approximately 5 μm to 30 μm.

With the abrasive tape in accordance with the present invention, since abrasive particles constituting the abrasive material are adhered to the coating film on the non-magnetic substrate by use of the binder exhibiting high adhesion and formed by combining a vinyl chloride-vinyl acetate-maleic acid copolymer, a polyamide resin with an epoxy resin, the abrasive particles and the binder are securely bound together, and the abrasive particles do not separate from the coating film during polishing of the magnetic head. Accordingly, it is possible to improve the durability of the coating film and the durability of the abrasive tape.

DESCRIPTION OF THE PREFERRED EMBODIMENTS

The present invention will hereinbelow be described in further detail with reference to the accompanying drawings.

Figure 1:
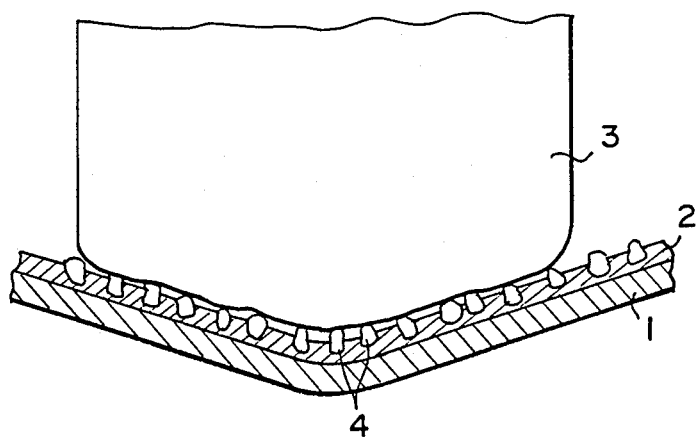
FIG. 1 is an enlarged sectional view showing an embodiment of the abrasive tape in accordance with the present invention in the use state for polishing a magnetic head.
Figure 2:
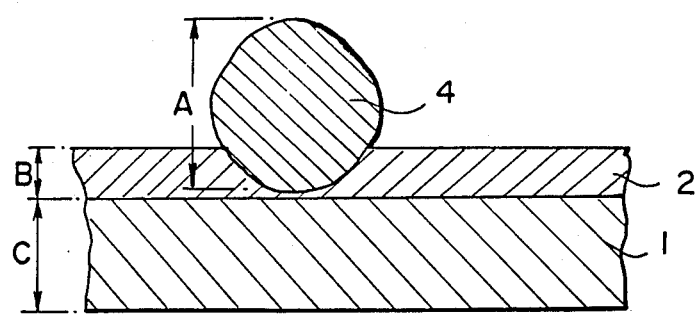
FIG. 2 is a schematic view showing a comparison of the thickness of the coating layer with the size of the abrasive particles in the embodiment of FIG. 1.

As shown in FIG. 1, an embodiment of the abrasive tape in accordance with the present invention comprises a flexible non-magnetic substrate 1, and a coating layer 2 overlaid on the substrate 1. The coating layer 2 is formed of an abrasive material, a binder and a lubricant kneaded together. The binder essentially consists of a vinyl chloride-vinyl acetate-maleic acid copolymer, a polyamide resin and an epoxy resin. Also, the abrasive material comprises abrasive particles of $Cr_2O_3$, $Al_2O_3$, SiC or the like having a Mohs hardness of 6 or higher, and having a particle size within the range of approximately 5 μm to 30 μm.

When the abrasive tape is used for polishing the tape sliding surface of the magnetic head 3, the abrasive tape is moved at a predetermined speed from one reel (not shown) to the other reel (not shown) disposed with the magnetic head 3 between the two reels. Thus the coating layer 2 is made to slide on the magnetic head 3. At this time, the tape sliding surface of the magnetic head 3 is polished smoothly by the abrasive particle 4 protruding out of the surface of the coating layer 2.

In general, in the abrasive tape, an abrasive particle 4 having a large particle size A is used for improving the polishing effects. Since the particle size A becomes markedly larger than a thickness B of the coating layer 2, the abrasive particle 4 protrudes greatly out of the surface of the coating layer 2, the binding force between the abrasive particle 4 and the coating layer 2 becomes weak, and the abrasive particle 4 readily separates from the coating layer 2 during polishing of the magnetic head. In the abrasive tape of the present invention, in order to increase the binding force between the abrasive particle 4 and the coating layer 2 for the purpose of preventing the abrasive particle 4 from separating from the coating layer 2, the binder exhibiting a high adhesion is used. Specifically, the binder comprises a vinyl chloride-vinyl acetate-maleic acid copolymer in which the adhesion is improved by inclusion of maleic acid as a third constituent, a polyamide resin and an epoxy resin which constitute a two-part type adhesive and which form a stout coating layer 2 free from shrinkage. When the binder comprising the three constituents is used, it is possible to securely adhere even the abrasive particle 4 having a large particle size to the coating layer 2, and to minimize separation of the abrasive particle 4. Accordingly, it becomes possible to markedly improve the durability of the coating layer 2.

As the lubricant, it is possible to use, for example, a silicone oil such as dimethyl polysiloxane. The non-magnetic substrate 1 may be formed of, for example, polyethylene terephthalate (PET), polyethylene naphthalate or the like, and may have a thickness of approximately 38 μm.

If the thickness B of the coating layer 2 is too large, contact of the abrasive tape with the magnetic head 3 becomes bad, depending on the shape and material of the magnetic head 3. Therefore, the thickness of the coating layer 2 should preferably be approximately 10 μm though it is not limited to this value.

The present invention will further be illustrated by the following nonlimitative example.

EXAMPLE

An abrasive tape 1 was prepared by applying a coating composition as shown below onto a 38 μm-thick polyethylene terephthalate (PET) substrate. The thickness of the coating layer outside of abrasive particles was 10 μm. The parts in the following description are parts by weight.

| Coating composition: | |
| --- | --- |
| $Cr_2O_3$ | 300 parts |
| (Size: 30 μm diameter, Mohs hardness: 6) | |
| Vinyl chloride-vinyl acetate-maleic acid copolymer | 20 parts |
| (400X 110A supplied by Nihon Zeon K.K.) | |
| Epoxy resin | 7 parts |
| (Epicoat 1001 or 828 supplied by Shell Sekiyu K.K.) | |
| Polyamide | 30 parts |
| (Tomide 225X or 210F supplied by Fuji Kasei K.K.) | |
| Lecithin | 5 parts |
| Methyl ethyl ketone | 100 parts |
| Methyl isobutyl ketone | 100 parts |
| Xylol | 100 parts |
| Butanol | 20 parts |

COMPARATIVE EXAMPLE 1

As a comparative example, an abrasive tape 2 was prepared by applying the coating composition as shown below onto a substrate similar to that used in the Example. The sample obtained by the Comparative Example 1 is the same as Sample No. 42 disclosed in Japanese unexamined patent publication No. 53(1978)-102017.

| Coating Composition: | |
| --- | --- |
| $Cr_2O_3$ | 300 parts |
| (Size: 30 μm diameter, Mohs hardness: 6) | |
| Vinyl chloride-vinylidene chloride copolymer | 46.4 parts |
| (copolymerization ratio: 7:3, polymerization degree: 400) | |
| Epoxy resin | 28.3 parts |
| (Epicoat 1001 supplied by Shell Sekiyu K.K.) | |
| Silicone oil | 1.0 part |
| (dimethyl polysiloxane) | |
| Isocyanate compound | 5.6 parts |
| (Desmodur L-75 supplied by Bayer A.G.) | |
| Butyl acetate | 800 parts |

COMPARATIVE EXAMPLE 2

An abrasive tape 3 was prepared by replacing the vinyl chloride-vinylidene chloride copolymer in the Comparative Example 1 by a vinyl chloride-vinyl acetate copolymer (copolymerization ratio: 87:13, polymerization degree: 350).

For the abrasive tapes of the Example and the Comparative Examples 1 and 2, the number of falling abrasive particles was investigated. The relative values of the results are shown in the following table.

| | Number of falling abrasive particles (relative value) |
| --- | --- |
| Example | 1 |
| Comparative Example 1 | 15 |
| Comparative Example 2 | 12 |

In this table, the number of falling abrasive particles was measured by observing the surface of the abrasive tape after being used for polishing a ferrite magnetic head by use of an electron microscope (magnification: 5,000), counting the number of falling abrasive particles in terms of the number of recesses, and expressing the count as a relative value.

As is clear from this table, with the abrasive tape of the present invention, it is possible to markedly decrease separation of the abrasive particles during polishing of the magnetic head.

We claim:

1. An abrasive tape comprising a flexible non-magnetic substrate, an abrasive coating film applied onto said flexible non-magnetic substrate and formed by kneading an abrasive material and a binder essentially consisting of a vinyl chloride-vinyl acetate-maleic acid copolymer, a polyamide resin and an epoxy resin, wherein said abrasive material has a Mohs hardness of 6 or higher and an average particle size within the range of 5 μm to 30 μm, and wherein said abrasive coating film has a thickness of approximately 10 μm.

* * * * *